(12) United States Patent
Qiu et al.

(10) Patent No.: US 7,496,067 B2
(45) Date of Patent: Feb. 24, 2009

(54) RESOURCE ALLOCATING METHOD, AND BASE STATION, MOBILE STATION, AND RADIO PACKET COMMUNICATION SYSTEM TO WHICH THE RESOURCE ALLOCATING METHOD IS APPLIED

(75) Inventors: Heng Qiu, Yokosuka (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 864 days.

(21) Appl. No.: 10/677,362

(22) Filed: Oct. 3, 2003

(65) Prior Publication Data
US 2004/0127225 A1 Jul. 1, 2004

(30) Foreign Application Priority Data
Oct. 3, 2002 (JP) ............................ P2002-291324

(51) Int. Cl.
*H04Q 7/00* (2006.01)
(52) U.S. Cl. .................... 370/329; 370/330; 455/509
(58) Field of Classification Search ................. 370/329, 370/330, 335, 320, 321, 343–344; 455/509, 455/510, 512
See application file for complete search history.

(56) References Cited

U.S. PATENT DOCUMENTS

| 5,515,379 | A | | 5/1996 | Crisler et al. | |
|---|---|---|---|---|---|
| 5,923,650 | A | * | 7/1999 | Chen et al. | 370/331 |
| 6,278,712 | B1 | * | 8/2001 | Takihiro et al. | 370/400 |
| 6,804,227 | B1 | * | 10/2004 | Sone et al. | 370/368 |
| 6,904,032 | B2 | * | 6/2005 | Cain | 370/337 |

(Continued)

FOREIGN PATENT DOCUMENTS

CN 1263675 A 8/2000

(Continued)

OTHER PUBLICATIONS

ANSI/IEEE Std 802, 11, pp. 74-76, 1999 Edition, "Local and Metropolitan Area Networks: Wireless Lan".

*Primary Examiner*—Edan Orgad
*Assistant Examiner*—Chuong T Ho
(74) *Attorney, Agent, or Firm*—Oblon, Spivak, McClelland, Maier & Neustadt, P.C.

(57) ABSTRACT

Provided is a resource allocating method capable of ensuring QoS according to priority levels and efficiently allocating resources. A resource allocating method according to the present invention is a resource allocating method in a radio packet communication system for letting a base station allocate a necessary resource to communication with a mobile station, which has a reservation signal transmitting step wherein the mobile station transmits a reservation signal containing priority level information of communication to let the base station receive it; a reserved time length setting step wherein, based on the priority level information in the reservation signal, a longer time is set as a reserved time length for allocation of a resource, for a high priority level than for a low priority level; and a resource allocation reserving step wherein when there is a resource available for allocation in a reserved time region defined by the reserved time length set in the reserved time length setting step, from a predetermined reservation start time, the base station allocates a resource for the communication with the mobile station having transmitted the reservation signal.

15 Claims, 8 Drawing Sheets

U.S. PATENT DOCUMENTS

| | | | |
|---|---|---|---|
| 6,982,987 B2 * | 1/2006 | Cain | 370/442 |
| 7,054,655 B2 * | 5/2006 | Ubuki et al. | 455/522 |
| 7,298,721 B2 * | 11/2007 | Atarashi et al. | 370/335 |
| 2001/0017882 A1 * | 8/2001 | Umeda et al. | 375/130 |
| 2001/0033557 A1 * | 10/2001 | Amalfitano | 370/335 |
| 2002/0012383 A1 | 1/2002 | Higuchi et al. | |
| 2002/0045458 A1 | 4/2002 | Parantainen et al. | |
| 2002/0159470 A1 * | 10/2002 | Atarashi et al. | 370/441 |
| 2003/0078050 A1 * | 4/2003 | Carlborg et al. | 455/452 |
| 2003/0100269 A1 * | 5/2003 | Lehtinen et al. | 455/69 |
| 2004/0204101 A1 * | 10/2004 | Qiu et al. | 455/561 |

FOREIGN PATENT DOCUMENTS

| | | |
|---|---|---|
| CN | 1318233 A | 10/2001 |
| EP | 0 831 669 A2 | 3/1998 |
| EP | 1 085 772 A2 | 3/2001 |
| EP | 1 128 577 A1 | 8/2001 |
| EP | 1 175 032 A1 | 1/2002 |
| GB | 2 358 552 A | 7/2001 |
| JP | 9-327072 | 12/1997 |
| JP | 2000-217159 | 8/2000 |
| JP | 2000-224231 | 8/2000 |
| JP | 2001-204075 | 7/2001 |
| JP | 2002-16545 | 1/2002 |
| JP | 2002-199438 | 7/2002 |

* cited by examiner

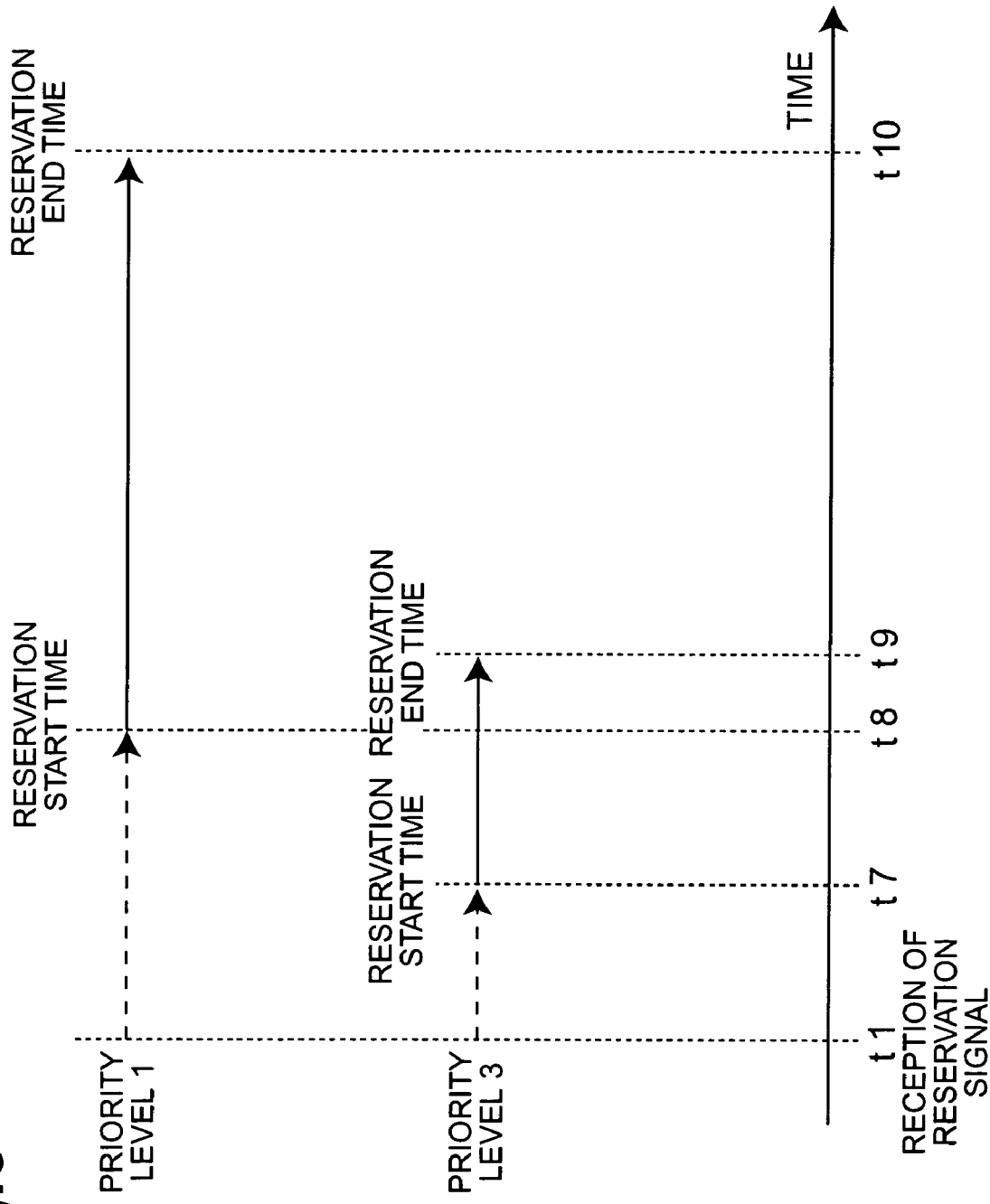

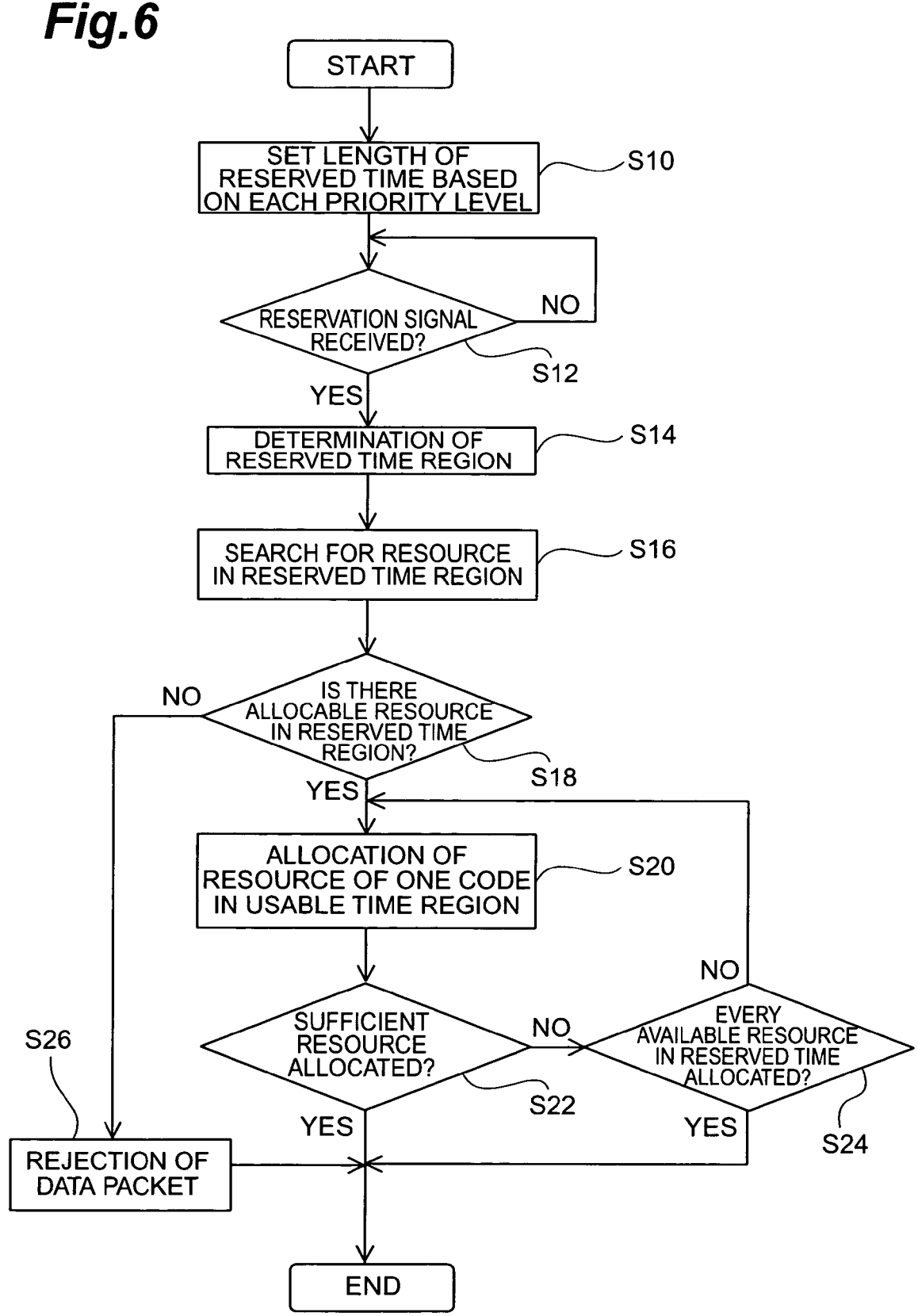

RESOURCE ALLOCATING METHOD, AND BASE STATION, MOBILE STATION, AND RADIO PACKET COMMUNICATION SYSTEM TO WHICH THE RESOURCE ALLOCATING METHOD IS APPLIED

BACKGROUND OF THE INVENTION

1. Field of the Invention

The present invention relates to a resource allocating method for a base station to allocate a necessary resource to communication with a mobile station, and to a base station, a mobile station, and a radio packet communication system to which the resource allocating method is applied.

2. Related Background Art

In a radio packet communication system such as a mobile communication system, on the occasion of implementing packet communication between a mobile station and a base station, the base station allocates a resource to communication with the mobile station.

One of the conventionally known resource allocating methods is, for example, the IEEE802.11b system defining the standards for radio data communication (cf. Nonpatent Document 1 below). In this system, packet communication is carried out as follows. When a terminal has packets to be transmitted, it checks a state of a channel through the use of the carrier-sense function. When a channel is idle (unused) on that occasion, the terminal starts transmitting the packets after a lapse of a predetermined time (IFS: Interframe Space). If the channel is busy (in use) on the occasion of checking the state of the channel through the use of the carrier-sense function, the terminal waits before the channel becomes idle. With detection of an idle state of the channel, the terminal starts transmitting the packets after a lapse of the IFS. If on this occasion packets have a plurality of priority classes, IFSs are determined according to the respective priority classes. As the IFSs, there are three values of SIFS (Short IFS), PIFS (PCF IFS), and DIFS (DCF IFS) in order from the shortest. For transmitting a packet with a high priority level, an IFS of a short value is used to permit the packet to occupy the channel at earlier timing than a packet with a lower priority level, whereby the packet can be preferentially transmitted.

There is also a conventionally known method of controlling the transmit power in uplinks in the W-CDMA system (cf. Patent Document 1 below). Attenuation of a radio wave increases with increasing distance, so as to pose the so-called "near-far problem" that communication becomes hard with a mobile station distant from the base station. In order to solve the "near-far problem," the W-CDMA system adopts such control on the transmit power as to equalize SIRs (Signal to Interference Ratios) of received data from all the mobile stations. Specifically, the base station calculates an SIR from a received pilot signal from a mobile station and compares the calculated SIR with a required SIR preliminarily set. Then the base station transmits a signal to control the transmit power, to the mobile station, in order to make the SIR calculated from the pilot signal, agree with the required SIR.

[Patent Document 1]
Japanese Patent Application Laid-Open No. 2002-16545

[Nonpatent Document 1]
IEEE802.11b 1999 Edition, pp. 74-76

SUMMARY OF THE INVENTION

However, there was room for further improvement in the following respects in the above resource allocating method.

In the IEEE802.11b system, neither terminal is allowed to transmit a packet during the time interval of the IFS between detection of the idle state of the channel and transmission of the packet. Particularly, where only packets with a low priority level are transmitted, the channel is kept idle during a long time interval. This sometimes resulted in wasting the channel resource. Furthermore, in the method of determining the IFSs according to the priority levels, packets with the high priority level are preferentially transmitted, and the difference between queueing times corresponding to respective priority levels needs to be set longer in time than the propagation delay of the system. The propagation delay increases with increasing radius of the system, and the queueing time is set longer according thereto. Namely, if the method of setting the queueing time of a packet according to its priority level is applied to a system with a large radius, it will lead to degradation of channel efficiency.

In the system wherein the base station calculates the SIR from the received pilot signal from each terminal and controls the SIR, the base station has no information about the propagation loss from each terminal, and this raised the following inconvenience. The terminals have the upper limit of transmit power, and in the recent radio packet communication systems, various types of terminals can be connected, which makes it difficult to uniformly predict maximum transmit powers of the terminals. Under such circumstances, if the resource is allocated over the maximum transmit power of a terminal, the terminal might not fully use the resource. This could result in wasting the resource which otherwise would be allocated to another terminal. In particular, where the propagation loss was large in transmission of packets from a terminal to the base station, there was the possibility that excess allocation of the resource occurred.

An object of the present invention is therefore to solve the above problem and thereby provide a resource allocating method capable of efficiently allocating the resource, and a base station, a mobile station, and a radio packet communication system to which the method is applied.

A first resource allocating method according to the present invention is a resource allocating method in a radio packet communication system for transmission and reception of packet data between a base station and a mobile station, in which the base station allocates a necessary resource to communication with the mobile station, the resource allocating method comprising: a reservation signal transmitting step wherein the mobile station transmits a reservation signal containing priority level information about a priority level of communication to let the base station receive the reservation signal; a reserved time length setting step wherein, based on the priority level information in the reservation signal transmitted in the reservation signal transmitting step, the base station sets a length of a reserved time for allocation of a resource, as a reserved time length; and a resource allocation reserving step wherein when there is a resource available for allocation in a reserved time region defined by the reserved time length set in the reserved time length setting step, from a predetermined reservation start time, the base station reserves allocation of a resource for the communication with the mobile station having transmitted the reservation signal. In the reserved time length setting step, preferably, a longer reserved time length is set for a high priority level than for a low priority level, based on the priority level information in the reservation signal.

In the resource allocating method according to the present invention, the reservation signal transmitted in the reservation signal transmitting step contains the priority level information about the priority level, and the length of the time reserved for resource allocation is determined based on the priority level information in the reserved time length setting step. This makes the resource allocation reflect the information about the priority level, whereby it becomes feasible to ensure QoS according to each priority level. A longer reserved time length is set for a high priority level than for a low priority level, whereby the base station is more likely to find an idle resource in the reserved time thus set. Therefore, the resource can be preferentially secured.

The above resource allocating method may be configured so that in the resource allocation reserving step, the reservation start time is set based on at least one of a reception time when the base station receives the reservation signal, and the priority level information in the reservation signal.

When the reservation start time for starting the reservation of allocation of the resource is set based on the reception time of receiving the reservation signal, the resource can be allocated on the basis of the reception time; for example, the reservation is started immediately after the reception of the reservation signal, or after a lapse of a fixed time. When the reservation start time is determined on the basis of the priority level information in the reservation signal, the reservation start time can be varied according to the priority level and thus the resource allocation is made to reflect the priority level information advantageously. When the reservation start time is determined based on both the reception time and the priority level information, the reservation start time can be finely controlled.

The above resource allocating method may be configured so that the reservation start time in the resource allocation reserving step is set at a shorter time after the reception time when the base station receives the reservation signal in the reservation signal transmitting step, for a low priority level than for a high priority level, based on the priority level information in the reservation signal.

When the reservation of the resource is started at the shorter time after the reception of the reservation signal, for the low priority level than for the high priority level, as described above, the resource can also be appropriately allocated to the communication with the low priority level. Namely, since the reserved time for resource allocation is longer for the communication with the high priority level than for the communication with the low priority level, if the reservations for the respective communications are started at the same time and if the reservation signals are received almost simultaneously, the resource will mostly be allocated to the communication with the high priority level and no resource will be available for the communication with the low priority level. By starting the reservation of the resource at the shorter time after the reception of the reservation signal for the communication with the low priority level, it becomes feasible to allocate the resource even to the communication with the low priority level. Since a longer (to a farther future) reserved time region is secured for the communication with the high priority level than for the communication with the low priority level, the communication with the high priority level will not be hindered.

A second resource allocating method according to the present invention is a resource allocating method in a radio packet communication system for transmission and reception of packet data by code division multiplexing between a base station and a mobile station, in which the base station allocates a necessary resource to communication with the mobile station, the resource allocating method comprising: a reservation signal transmitting step wherein the mobile station transmits a reservation signal containing maximum transmit power information of the mobile station and transmit power information of the reservation signal to let the base station receive the reservation signal; a propagation loss calculating step of calculating a propagation loss in transmission of a packet from the mobile station to the base station, based on the transmit power information in the reservation signal transmitted in the reservation signal transmitting step, and a received power in reception of the reservation signal at the base station; a maximum received power calculating step wherein the base station calculates a maximum received power of a signal received from the mobile station, based on the maximum transmit power information in the reservation signal, and the propagation loss calculated in the propagation loss calculating step; a maximum transmission rate calculating step of calculating a maximum transmission rate allocable to the mobile station, based on the maximum received power calculated in the maximum received power calculating step; and a resource allocating step of allocating a resource to the mobile station, based on the maximum transmission rate calculated in the maximum transmission rate calculating step.

In the resource allocating method according to the present invention, the reservation signal transmitted in the reservation signal transmitting step contains the transmit power information thereof and the maximum transmit power information of the mobile station. The base station, receiving the reservation signal, calculates the propagation loss in transmitting a packet from the mobile station to the base station, based on the transmit power information in the reservation signal and the received power of the reservation signal, and calculates the maximum transmission rate allocable to the mobile station at the base station, from the calculated propagation loss and the maximum transmit power information in the reservation signal. By determining the allocable maximum transmission rate in this way and allocating the resource within the maximum transmission rate, the resource can be efficiently used, without allocating the resource over the allocable transmission rate determined based on the maximum transmit power of the mobile station and others and without wasting the resource which otherwise would be allocated to another mobile station.

A third resource allocating method according to the present invention is a resource allocating method in a radio packet communication system for transmission and reception of packet data by code division multiplexing between a base station and a mobile station, in which the mobile station transmits a reservation signal to the base station and in which the base station allocates a necessary resource to communication with the mobile station on the basis of the reservation signal transmitted from the mobile station, wherein, on the occasion of allocating a resource to the mobile station, the base station designates a spreading code to be allocated to the mobile station, for each reservation signal.

By designating a spreading code for each reservation signal upon the resource allocation as described, it becomes advantageously feasible to freely designate a spreading code used for the preamble and a spreading code for packet data subsequent thereto. The number of spreading codes available at a base station is finite, and by designating a spreading code for each reservation signal, without fixing the spreading codes in units of mobile stations, it is feasible to increase the number of mobile stations that can be connected to one base station. In the aforementioned first and second resource allocating methods, a spreading code to be allocated to the mobile station may be designated for each reservation signal.

A first radio packet communication system according to the present invention is a radio packet communication system for transmission and reception of packet data between a base station and a mobile station, which comprises the base station according to the present invention for allocating a necessary resource to communication with the mobile station; and the mobile station according to the present invention for transmission and reception of packet data to and from the base station, using the resource allocated by the base station.

The base station according to the present invention is a base station configured to perform transmission and reception of packet data to and from a mobile station and allocate a necessary resource to communication with the mobile station, the base station comprising: reservation signal receiving means for receiving a reservation signal transmitted from the mobile station and containing priority level information about a priority level of communication; reserved time length setting means for, based on the priority level information in the reservation signal received by the reservation signal receiving means, setting a length of a reserved time for allocation of a resource, as a reserved time length; and resource allocation reserving means for, when there is a resource available for allocation in a reserved time region defined by the reserved time length set by the reserved time length setting means, from a predetermined reservation start time, allocating a resource for the communication with the mobile station as a transmitter of the reservation signal. Preferably, the reserved time length setting means sets a longer reserved time length for a high priority level than for a low priority level, based on the priority level information in the reservation signal.

The mobile station according to the present invention is a mobile station configured to, using a resource allocated by a base station, perform transmission and reception of packet data to and from the base station, the mobile station comprising: reservation signal transmitting means for transmitting a reservation signal containing priority level information about a priority level of communication, to the base station.

The mobile station according to the present invention comprises the reservation signal transmitting means for transmitting the reservation signal containing the priority level information, to the base station, and transmits the reservation signal, prior to transmission of packet data. Then the base station according to the present invention makes the reserved time length setting means determine the length of the time reserved for resource allocation, based on the priority level information in the reservation signal transmitted from the mobile station. In this configuration, the radio packet communication system (base station) according to the present invention can make the allocation of the resource reflect the information of the priority level and ensure QoS for each priority level. The reserved time length setting means sets a longer reserved time for a high priority level than for a low priority level, whereby the base station is more likely to find an idle resource in the reserved time thus set. Therefore, the resource can be preferentially secured for the high priority level.

The above radio packet communication system may be configured so that the resource allocation reserving means of the above base station sets the reservation start time on the basis of at least one of a reception time when the reservation signal receiving means receives the reservation signal, and the priority level information in the reservation signal.

In the radio packet communication system (base station) according to the present invention, where the resource allocation reserving means sets the reservation start time for starting the reservation of allocation of the resource, based on the reception time of receiving the reservation signal, the allocation of the resource can be performed on the basis of the reception time; for example, the reservation may be started immediately after the reception of the reservation signal, or after a lapse of a fixed time. When the resource allocating means determines the reservation start time, based on the priority level information in the reservation signal, the reservation start time can be altered according to the priority level and it is thus advantageously feasible to make the resource allocation reflect the priority level information. When the reservation start time is determined based on both the reception time and the priority level information, the reservation start time can be finely controlled.

The above radio packet communication system may be configured so that the resource allocation reserving means of the above base station sets the reservation start time at a shorter time after the reception time when the reservation signal transmitting means transmits the reservation signal, for a low priority level than for a high priority level, based on the priority level information in the reservation signal.

When the reservation of the resource is started at the shorter time after the reception of the reservation signal, for the low priority level than for the high priority level as described above, the resource allocation reserving means can appropriately allocate the resource even to the communication with the low priority level. Namely, since the longer reserved time for resource allocation is set for the communication with the high priority level than for the communication with the low priority level, if reservations for the respective communications are started at the same time and if the reservation signals are received almost simultaneously, the resource will mostly be taken by the communication with the high priority level, and there will remain no resource for the communication with the low priority level. When the reservation of the resource is started at the shorter time after the reception of the reservation signal, for the communication with the low priority level, it becomes feasible to allocate the resource even to the communication with the low priority level. Since the communication with the high priority level has the longer (to a farther future) reserved time region than the communication with the low priority level, the communication with the high priority level will not be hindered.

A second radio packet communication system according to the present invention is a radio packet communication system for transmission and reception of packet data by code division multiplexing between a base station and a mobile station, which comprises the base station according to the present invention for allocating a necessary resource to communication with the mobile station; and the mobile station according to the present invention for performing communication using the resource allocated by the base station.

The base station according to the present invention is a base station configured to implement transmission and reception of packet data by code division multiplexing to and from a mobile station and allocate a necessary resource to communication with the mobile station, the base station comprising: reservation signal receiving means for receiving a reservation signal transmitted from the mobile station and containing maximum transmit power information of the mobile station and transmit power information of the reservation signal; propagation loss calculating means for calculating a propagation loss in transmission of a packet from the mobile station, based on the transmit power information in the reservation signal received by the reservation signal receiving means and information about a received power in reception of the reservation signal by the reservation signal receiving means; maximum received power calculating means for calculating a maximum received power of a signal received from the mobile station, based on the maximum transmit power information in the reservation signal and the propagation loss calculated by the propagation loss calculating means; maximum transmission rate calculating means for calculating a maximum transmission rate allocable to the mobile station, based on the maximum received power calculated by the maximum received power calculating means; and resource allocating means for allocating a resource to the mobile station, based on the maximum transmission rate calculated by the maximum transmission rate calculating means.

The mobile station according to the present invention is a mobile station for, using a resource allocated by a base station, performing transmission and reception of packet data by code division multiplexing to and from the base station, the mobile station comprising: reservation signal transmitting means for transmitting to the base station a reservation signal containing maximum transmit power information of the mobile station and transmit power information of the reservation signal; and transmission rate changing means for changing a transmission rate according to a resource set based on the reservation signal transmitted by the reservation signal transmitting means.

The mobile station according to the present invention comprises the reservation signal transmitting means for transmitting the reservation signal containing the transmit power information thereof and the maximum transmit power information of the mobile station to the base station, and transmits the reservation signal, prior to transmission of packet data. Then the base station according to the present invention calculates the propagation loss in transmitting a packet from the mobile station to the base station, based on the transmit power information in the reservation signal and the received power of the reservation signal, and calculates the maximum transmission rate allocable to the mobile station at the base station, from the calculated propagation loss and the maximum transmit power information in the reservation signal. The base station determines the allocable maximum transmission rate and allocates the resource within this maximum transmission rate. In this configuration, the radio packet communication system (base station) according to the present invention can efficiently use the resource, without allocating the resource over the allocable transmission rate determined based on the maximum transmit power of the mobile station and others and without wasting the resource which otherwise would be allocated to another mobile station.

A third radio packet communication system according to the present invention is a radio packet communication system for transmission and reception of packet data by code division multiplexing between a base station and a mobile station, which comprises the base station according to the present invention for allocating a necessary resource to communication with the mobile station, based on the reservation signal received from the mobile station; and the mobile station according to the present invention for performing communication using the resource allocated by the base station.

The base station according to the present invention is a base station applied to a radio packet communication system for transmission and reception of packet data by code division multiplexing to and from a mobile station and configured to receive a reservation signal transmitted from the mobile station and allocate a necessary resource to communication with the mobile station on the basis of the reservation signal received, wherein a spreading code to be allocated to the mobile station is designated for each reservation signal.

The mobile station according to the present invention is a mobile station for, using a resource allocated by a base station, performing transmission and reception of packet data by code division multiplexing to and from the base station, the mobile station comprising: reservation signal transmitting means for transmitting a reservation signal to the base station; and communication means for performing communication using a spreading code designated by the base station for each reservation signal transmitted by the reservation signal transmitting means.

By designating a spreading code for each reservation signal in the resource allocation as described, it becomes advantageously feasible to freely designate a spreading code used for the preamble and a spreading code for packet data subsequent thereto. The number of spreading codes at a base station is finite, and by designating a spreading code for each reservation signal, without fixing the spreading codes in units of mobile stations, it is feasible to increase the number of mobile stations that can be connected to one base station. In the above first and second radio packet communication systems, the base station may be configured to designate a spreading code to be allocated to the mobile station, for each reservation signal.

According to the present invention, a difference is made between lengths of time regions that can be reserved for data packets according to the priority levels of the data packets in the allocation of the resource at the base station, whereby the resource for data packets is preferentially reserved for data packets with a high QoS demand and whereby it becomes feasible to ensure QoS in access on the radio band.

Furthermore, by allocating the resource with consideration to the propagation loss of data packets, it becomes feasible to prevent the resource from being allocated to the mobile station over its capability and to efficiently allocate the radio resource in accordance with the propagation loss between the mobile station and the base station, and the performance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention may be more readily described with reference to the accompanying drawings, in which:

FIG. 5 is an illustration for explaining a method of determining the reservation start time;

FIG. 6 is a flowchart showing a resource allocating method according to a first embodiment;

DESCRIPTION OF THE PREFERRED EMBODIMENTS

The preferred embodiments of the radio packet communication system, base station, and mobile station according to the present invention will be described below in detail with reference to the drawings. The same elements will be denoted by the same reference symbols throughout the description of the drawings, without redundant description thereof.

Figure 1:
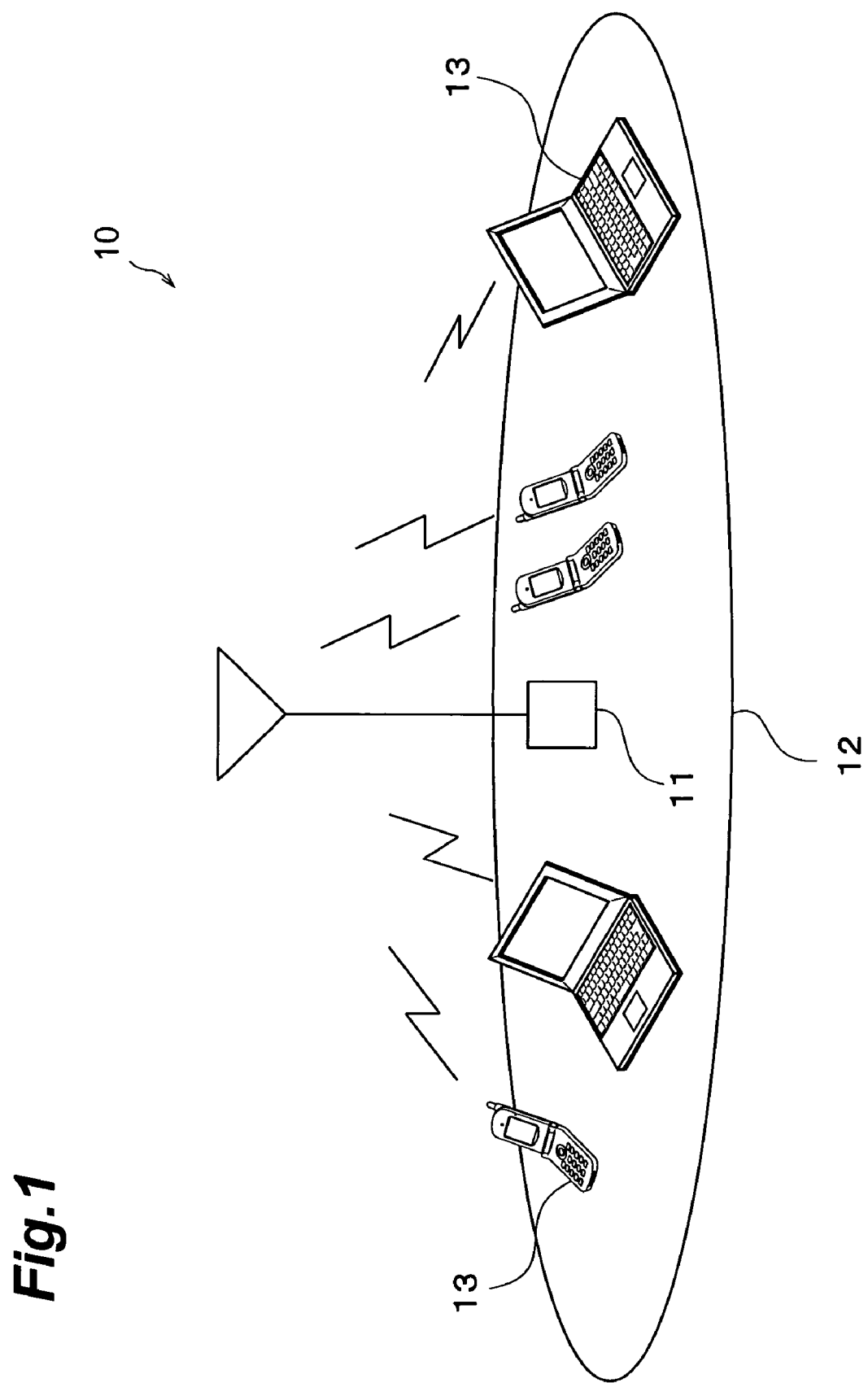
FIG. 1 is an illustration showing a schematic configuration of a radio packet communication system according to an embodiment.

FIG. 1 is an illustration showing the schematic configuration of radio packet communication system 10 according to an embodiment of the present invention. The present embodiment will be described using an example of a CDMA packet communication system in which packets transmitted and received between base station 11 and mobile station 13 are code division multiplexed on the radio band.

In radio packet communication system 10, a plurality of mobile stations (terminals) 13 exist in radio zone 12 established by base station 11. Then packet data such as video data, audio data, etc. is transmitted and received between mobile stations 13 and base station 11 by code division-packet multiplexing on a common radio channel.

Figure 2:
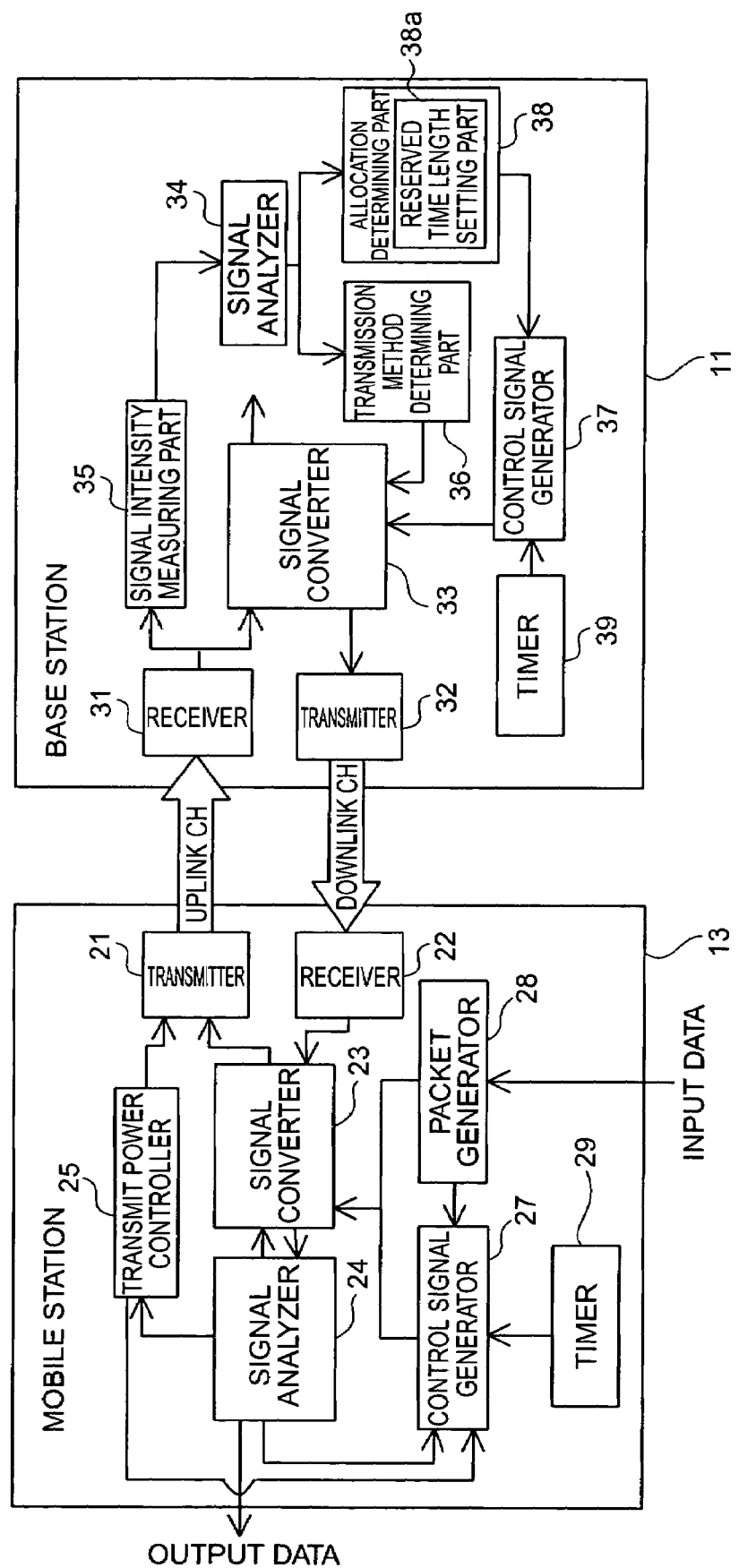
FIG. 2 is an illustration showing configurations of a base station and a mobile station according to an embodiment.

The base station 11 and mobile station 13 forming the radio packet communication system 10 will be described below. FIG. 2 is a block diagram showing configurations of base station 11 and mobile station 13 according to an embodiment.

As shown in FIG. 2, mobile station 13 is provided with transmitter 21, receiver 22, signal converter 23, signal analyzer 24, transmit power controller 25, control signal generator 27, packet generator 28, and timer 29. Each of the components will be described below in detail.

Receiver 22 is a circuit that receives signals such as an allocation signal, a synchronization signal, a confirmation signal, etc. transmitted through a radio communication link from base station 11. Receiver 22 has a function of outputting a received signal to signal converter 23.

Signal converter 23 is a circuit that converts transmitted or received data into a predetermined signal. Signal converter 23 has a function of effecting encoding and spreading processes on a data packet fed from packet generator 28 or a reservation signal and others fed from control signal generator 27, and outputting the resultant to transmitter 21. Signal converter 23 also has a function of effecting decoding and despreading processes on a signal fed from receiver 22, and outputting the resultant to signal analyzer 24. Signal converter 23 further has a function of spreading a data packet by a spreading code notified of by an allocation signal supplied from the signal analyzer 24, and transmitting the data packet in a transmission time zone notified of by the allocation signal.

Signal analyzer 24 is a circuit that analyzes a signal obtained by conversion at signal converter 23 and outputs the result of the analysis to each part according to a type of the received signal. For example, the signal analyzer 24 has such functions as 1) a function of outputting information about a spreading code assigned to a data packet and about a transmission time zone, received from base station 11, to signal converter 23; 2) a function of outputting information about a transmit power assigned to a data packet, received from base station 11, to transmit power controller 25; and 3) a function of outputting synchronization information extracted from pilot information from base station 11, to control signal generator 27.

Transmit power controller 25 is a circuit that controls a transmit power of a signal transmitted at transmitter 21. Transmit power controller 25 has a function of varying the transmit power of each packet on the basis of TPC from signal analyzer 24, and a function of outputting information about a transmit power of a reservation signal to control signal generator 27.

Transmitter 21 is a circuit that transmits a signal through a radio communication link to base station 11. Transmitter 21 transmits a signal obtained by conversion at signal converter 23. Each signal such as packet data, a reservation signal, or the like transmitted from transmitter 21 is converted by a predetermined spreading code by signal converter 23 and transmitted data is set in a predetermined time region and transmitted by a transmit power based on an instruction from transmit power controller 25.

Packet generator 28 is a circuit that generates a data packet. Packet generator 28 has a function of, with input of packet data over a predetermined length, dividing the input data into a plurality of packet data of the predetermined length. The packet data generated by packet generator 28 is outputted to signal converter 23. Packet generator 28 determines a priority level of each data packet, based on information about the real-time property of input data (for example, in the case of an IP packet, information about the real-time property is read out of the Head part of the packet), a charge plan, etc., and outputs priority level information about the priority level to control signal generator 27.

Control signal generator 27 is a circuit that generates various control signals for communication control. Control signal generator 27 generates synchronization and reservation signals, and outputs a generated signal to signal converter 23. Control signal generator 27 has a function of generating a reservation signal containing information about a priority level of each data packet fed from packet generator 28, information about a reservation signal transmit power fed from transmit power controller 25, and information about a maximum transmit power of mobile station 13. This control signal generator 27 is connected to timer part 29 and has a function of generating synchronization signals on a periodic basis.

A packet data transmitting part is comprised of the control signal generator 27, signal converter 23, signal analyzer 24, transmit power controller 25, and packet generator 28. This packet data transmitting part acquires the information about the transmission time region, spreading code, transmit power, etc. determined by base station 11 on the basis of the reservation signal transmitted prior to transmission of packet data, and performs transmission of packet data based on the acquired information. Namely, it makes the receiver 22, signal converter 23, and signal analyzer 24 acquire and analyze the allocation signal transmitted from base station 11. Then signal converter 23 performs encoding and spreading of a data packet, based on the information of the spreading code designated by the allocation signal. Furthermore, it outputs the data packet to the transmitter 21 in the time zone designated by the allocation signal. Then transmitter 21 makes transmit power controller 25 change the data packet fed from signal converter 23, based on the transmit power designated by the allocation signal, and transmits the data packet.

In the present embodiment, a reservation signal transmitting part is comprised of the control signal generator 27, signal converter 23, and transmitter 21. The reservation signal transmitting part transmits to base station 11 information about the volume of subsequent packet data, the priority level, the transmit power of the reservation signal, and the maximum possible transmit power of mobile station 13 as a reservation signal, prior to transmission of the data packet.

Base station 11 will be described below. As shown in FIG. 2, base station 11 has receiver 31, transmitter 32, signal converter 33, signal analyzer 34, received intensity measuring part 35, transmission method determining part 36, allocation determining part 38, control signal generator 37, and timer part 39.

Transmitter 32 is a circuit that transmits various signals through a radio communication link to mobile station 13. A transmission channel and a transmit power are set based on a determination made by transmission method determining part 36.

Receiver 31 is a circuit that receives a signal transmitted from mobile station 13, through a radio communication link. Receiver 31 outputs a received signal to received intensity measuring part 35 and to signal converter 33.

Received intensity measuring part 35 measures the intensity of a signal fed from receiver 31 and outputs the result of the measurement to signal analyzer 34.

Signal converter 33 is a circuit that converts a signal transmitted or received, into a signal of a predetermined signal format. Signal converter 33 effects the encoding process and spreading process on various signals fed from control signal generator 37 and outputs the resultant to transmitter 32. Signal converter 33 also performs the decoding and despreading of a received signal fed from receiver 31 and outputs the resultant to signal analyzer 34.

Signal analyzer 34 is a circuit that analyzes various signals converted by signal converter 33 and fed from signal converter 33. Signal analyzer 34 analyzes the contents of the reservation and synchronization signals transmitted from mobile station 13, extracts information included in the signals, and outputs the result of the analysis to allocation determining part 38 and to transmission method determining part 36. For example, it extracts the information about the volume of packet data and the priority level, the transmit power information, the maximum transmit power information, etc. included in the reservation signal, and outputs the volume of packet data, priority level information, and maximum transmit power information to allocation determining part 38. Furthermore, signal analyzer 34 calculates a propagation loss from the transmit power information in the reservation signal and the information about the received power supplied from received intensity measuring part 35, and outputs the information about the propagation loss to the allocation determining part 38 and to the transmission method determining part 36.

Allocation determining part 38 determines a transmission rate of packet data of each mobile station 13 on the basis of the information about the propagation loss of each mobile station 13 fed from signal analyzer 34. Allocation determining part 38 has reserved time length setting part 38a for determining a length of a reserved time on the basis of the priority level information in the reservation signal, which sets a reserved time length for each reservation signal. Allocation determining part 38 makes the reserved time length setting part 38a determine a spreading code on the basis of the priority level information of packet data supplied from signal analyzer 34. It is noted herein that a spreading code is designated for each reservation signal and there are also cases where different spreading codes are designated for respective reservation signals even from one mobile station 13. This increases degrees of freedom in designation of spreading codes and the number of mobile stations 13 that can be connected to base station 11. Allocation determining part 38 outputs the transmit power, time region, spreading code, etc. thus determined, to control signal generator 37, and control signal generator 37 adds these information to an allocation signal to be transmitted to mobile station 13.

Transmission method determining part 36 determines a transmit power on the basis of the information about the propagation loss from signal analyzer 34 and outputs the determined transmission method to signal converter 33 and to transmitter 32.

Control signal generator 37 is a circuit that generates a confirmation signal, a synchronization signal, an allocation signal, or the like, based on the determination at transmission method determining part 36, and outputs the signal to signal converter 33. This control signal generator 37 generates periodic synchronization signals on the basis of control of timer part 39.

Figure 3:
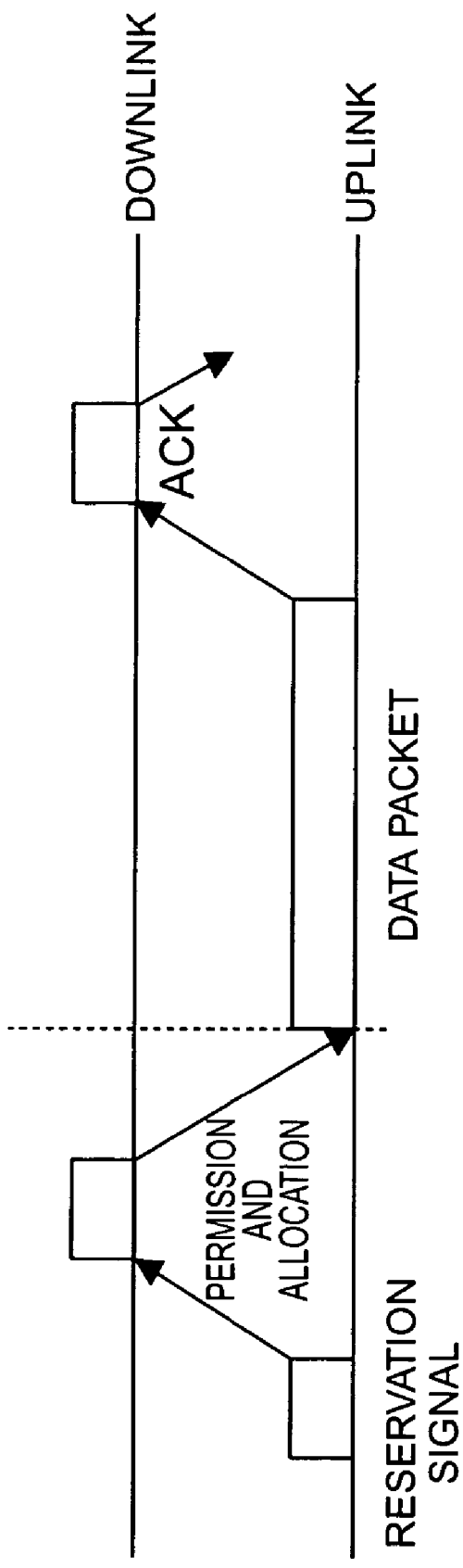
FIG. 3 is an illustration showing the procedure of transmitting packets from a mobile station to a base station.

The transmission and reception methods of packet data between base station 11 and mobile station 13 will be described below. FIG. 3 is an illustration to illustrate the fundamental flow in transmission of packet data from mobile station 13 to base station 11. As shown in FIG. 3, mobile station 13 transmits a reservation signal to base station 11, prior to transmission of packet data. On this occasion, the reservation signal is made to contain the volume of packet data, the priority level information of the packet data, the transmit power of the reservation signal, the maximum possible transmit power, and so on. Then base station 11, receiving the reservation signal from mobile station 13, allocates a resource to communication with mobile station 13, permits mobile station 13 to perform the communication, and transmits an allocation signal. When receiving the allocation signal from base station 11, mobile station 13 transmits the data packet to the base station 11 under the condition notified of by the received allocation signal. When base station 11 successfully receives the data packet from mobile station 13, it transmits an acknowledgment (ACK) to mobile station 13.

The following will provide the description of the allocation method of letting base station 11 allocate a resource to communication with mobile station 13 in radio packet communication system 10, in addition to the resource allocating method according to an embodiment of the present invention.

Figure 4A:
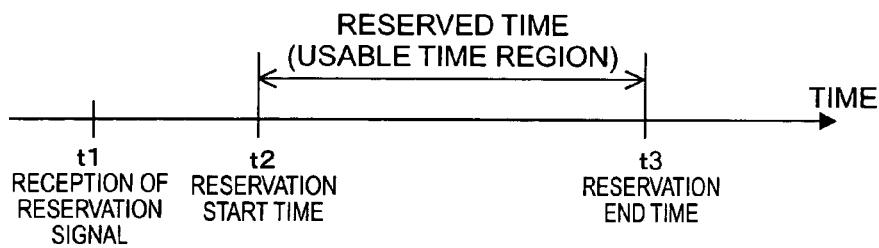
FIG. 4A is an illustration for explaining the fundamental idea of resource allocation.
Figure 4B:
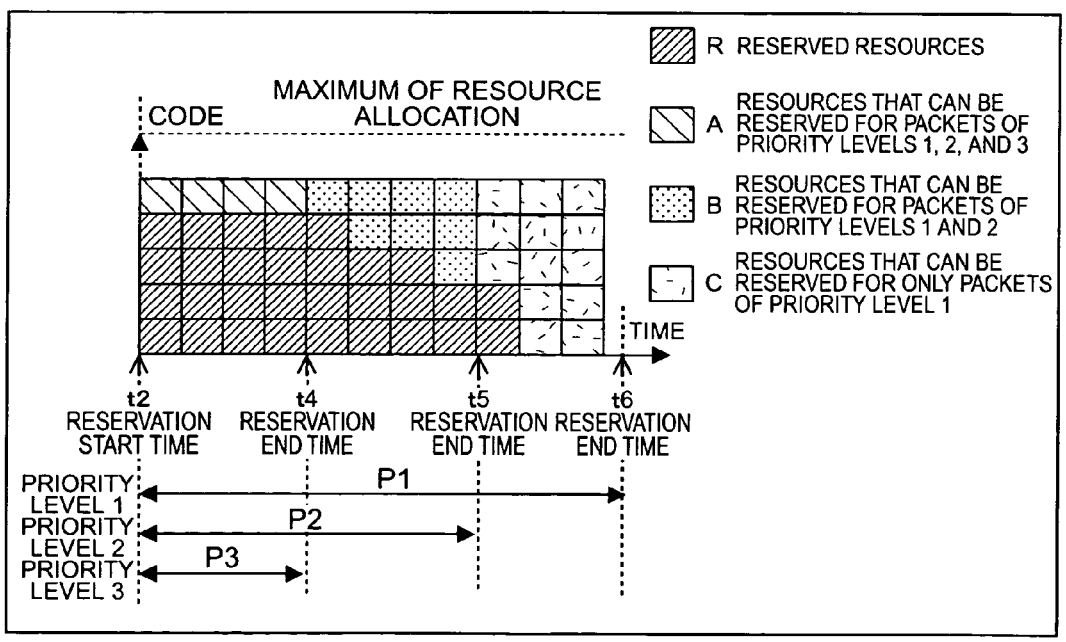
FIG. 4B is an illustration for explaining the fundamental idea of resource allocation.

FIGS. 4A and 4B are illustrations showing the fundamental idea of the resource allocating method according to the present embodiment. In the resource allocating method according to the present embodiment, securement of a resource according to a priority level is implemented by a method of reserving allocation of a resource. First, the reservation of allocation of the resource will be described referring to FIG. 4A. As shown in FIG. 4A, when base station 11 receives a reservation signal at time t1, it sets a time interval between predetermined time t2 and time t3 as a reserved time for allocation of a resource to mobile station 13 having transmitted the reservation signal (which will be referred to hereinafter as a "target mobile station"). When there is a resource that can be allocated within the reserved time, the base station allocates the resource to target mobile station 13. A length of the reserved time is set according to the priority level information in the reservation signal. A long reserved time is provided for a high priority level, while a short reserved time for a low priority level. FIG. 4B is an illustration showing an example of the reservation status of resources. In the table shown in a matrix pattern in FIG. 4B, rows represent codes, while columns slots. In FIG. 4B, the reservation status of resources is illustrated for eleven slots from reservation start time t2 to time t6. Here is an example of a system capable of allocating five codes to one slot. For convenience' sake of description, the slots are named as the first slot, the second slot, . . . , the eleventh slot from the side closest to time t2. As indicated by region R in FIG. 4B, four codes are already reserved (already allocated) in the first slot to the fifth slot, three codes in the sixth and seventh slots, and two codes in the eighth and ninth slots. For a reservation signal with priority level 1, which is the highest priority level, a resource can be reserved in a time region of longest duration P1 from time t2 to time t6. Namely, all regions A, B, and C are candidates for resource allocation. For a reservation signal with priority level 2, which is the next highest priority level, a resource can be reserved in a time region of duration P2 from time t2 to time t5. Namely, regions A and B are candidates for resource allocation. In this example, for a reservation signal with priority level 3, which is the lowest priority level, a resource can be reserved in a time region of shortest duration P3. Only region A is a candidate for resource allocation. By setting the longest reserved time for the high priority level and setting the decreasing reserved time with decrease in the priority level as described above, the base station is more likely to allocate the resource to a reservation signal with a higher priority level.

A method of setting the reservation start time will be described below. It is, however, noted that the reservation start time can be set by any other method than the method described below. For example, the reservation start time may be set at a predetermined time after the time of receiving the reserved time, or the reservation start time may be set at a predetermined time after the time of transmission of the reservation signal. The reason is that even if the reservation start time is set by any method, the base station is more likely to secure the resource for a longer reserved time and it is feasible to implement the resource allocation based on priority levels.

Base station 11 in the present embodiment is configured to vary the reservation start time according to the priority level. This will be explained with reference to FIG. 5. As shown in FIG. 5, a time interval from the reception of the reservation signal to the reservation start time is set longer for a reservation signal with a high priority level, whereas a time interval from the reception of the reservation signal to the reservation start time is set shorter for a reservation signal with a low priority level. When the time interval to the reservation start time is set shorter for the reservation signal with the low priority level in this way, the resource can be allocated for the reservation signal with the low priority level during the time period between time t7 and time t8, before the time t8 when the resource allocation is started for the reservation signal with the high priority level. Since the reservation signal with the high priority level has the resource reserved time from time t8 to time t10, the resource is more likely to be allocated thereto, and the communication thereof will not be hindered. By setting the reservation start time in this way, it is feasible to circumvent such a situation that it is difficult to allocate the resource to the reservation signal with the low priority level because of exclusive use of the resource by the reservation signal with the high priority level, even with increase in traffic.

It is preferable to set the priority level higher with increase in the real time property of the data packet or to set the priority level higher with increasing charge.

The flow of resource allocation in radio packet communication system 10 according to an embodiment will be described below with reference to FIG. 6. FIG. 6 is a flowchart showing the operation of resource allocation at base station 11.

First, as a preparation stage for implementing the resource allocation according to the present embodiment, base station 11 sets as system setting parameters lengths of time regions for resource reservation corresponding to the respective priority levels (S10).

Prior to transmission of data packets, mobile station 13 transmits a reservation signal containing the priority level information, to base station 11. Base station 11 always waits for a reservation signal (S12). When base station 11 receives a reservation signal, it determines a reserved time region for reservation of the resource for communication with target mobile station 13 as a sender of the reservation signal (S14). Specifically, base station 11 reads the priority level information out of the reservation signal, and retrieves a length of a reserved time region corresponding to the priority level thus read, out of the setting parameters of the system to determine the length of the reserved time (reserved time length). Base station 11 sets a reservation start time on the basis of the priority level information read out of the reservation signal and the reception time of the reservation signal.

Then base station 11 searches for a resource in the reserved time region thus determined (S16), and determines whether there is an allocable resource not reserved yet (S18). When it is determined that there is an allocable resource, base station 11 allocates a resource of one code in the reserved time region (S20). Subsequently, base station 11 retrieves information about the volume of packet data out of the reservation signal and determines whether the resource allocated is sufficient to transmit the data packets (S22). When it is determined that the resource allocated is sufficient, the base station terminates the resource allocation and waits for reception of another reservation signal. When it is determined that the resource allocated is insufficient, it is determined whether every available resource in the reserved time region has been allocated (S24). When every available resource in the reserved time region does not have been allocated (i.e., when there is a remaining resource), the base station moves to a process of allocating a resource of one code in the available region. When there is no available resource in the reserved time region, the flow of resource allocation ends. In this case, the resource enough to transmit the entire data packet volume designated by the reservation signal is not secured. For the data over the resource secured, the mobile station again transmits a reservation signal to request allocation of a further resource. When the resource enough to transmit the data packets is allocated or when every resource in the reserved time region is allocated, as described above, the resource allocation process ends. After the end of the resource allocation process, base station 11 again moves to step S12 of waiting for reception of a reservation signal.

When it is determined at step S18 that there is no available resource in the reserved time region, the base station rejects transmission of the data packets (S26). When rejecting the transmission of data packets, base station 11 transmits a rejection signal to mobile station 13. Conversely, when the resource is successfully allocated to even part of the data packets to be transmitted, the base station transmits an allocation signal to permit the transmission of data packets, to mobile station 13.

According to the resource allocating method as described above, the resource can be reserved in a longer reserved time region, for a data packet with a high priority level than for a data packet with a low priority level, whereby it is feasible to readily ensure QoS of the data packet with the high priority level.

This resource allocating method successfully permits the resource to be efficiently allocated, while solving the problem that neither terminal is allowed to transmit a packet in the time region of IFS between detection of an idle state of a channel and transmission of a packet.

The resource allocating method according to the second embodiment of the present invention will be described below. This resource allocating method can be substantialized by aforementioned radio packet communication system 10.

Figure 7:
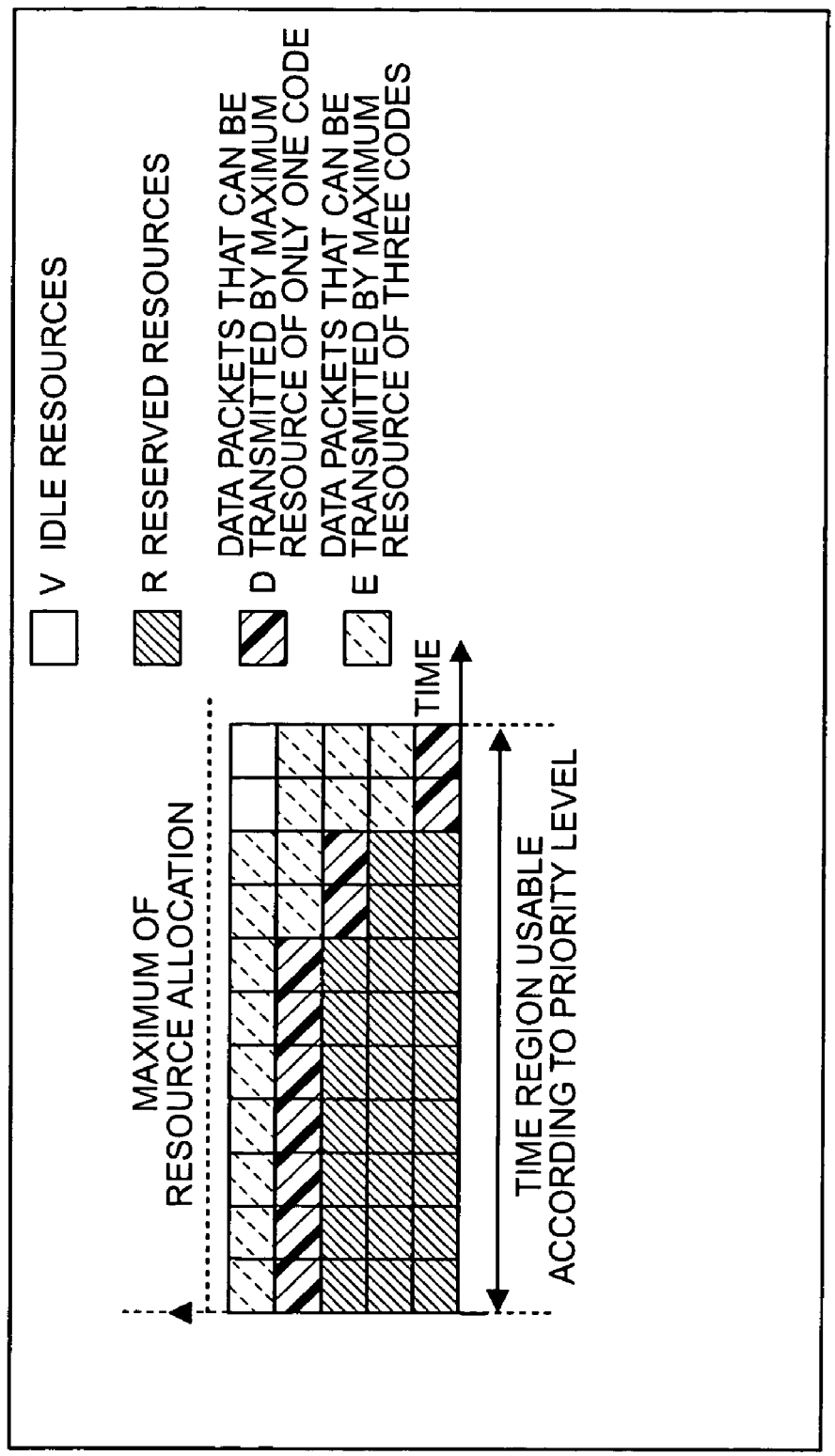
FIG. 7 is an illustration for explaining the fundamental idea of resource allocation.

First, the idea of the resource allocating method according to the second embodiment will be described with reference to FIG. 7. FIG. 7 shows the fundamental idea of the allocation scheme. In this resource allocating method, the resource is allocated with consideration to a propagation loss of a data packet. FIG. 7 is an illustration showing the reservation status of resources in an available time region, similar to FIG. 4. The part indicated by region R represents the resources already reserved.

Mobile stations 13 connected to base station 11 have their respective maximum transmit powers different from each other, so that maximum possible transmission rates of the respective mobile stations are different from each other. Therefore, base station 11 calculates a maximum transmission rate of each mobile station 13 according to a maximum possible received power of each mobile station 13 calculated from the maximum transmit power and propagation loss of each mobile station 13, and allocates the resource within the maximum transmission rate. In the example shown in FIG. 7, the mobile stations exemplified herein include those capable of communication using the maximum resource of one code and those capable of communication using the maximum resource of three codes. If a mobile station 13 is allocated the resource over the maximum transmission rate, it cannot fully use the resource in terms of the transmit power.

In the resource allocating method according to the second embodiment, therefore, as shown in FIG. 7, mobile station 13 capable of using the maximum resource of one code is allocated only one code in one slot, as indicated by region D, and mobile station 13 capable of using the maximum resource of three codes is allocated up to three codes in one slot, as indicated by region E. Even if there is an idle resource, the resource will not be allocated over the maximum capability. Referring to FIG. 7, there are resources available for allocation in the tenth and eleventh slots, but the resources are not reserved.

Figure 8:
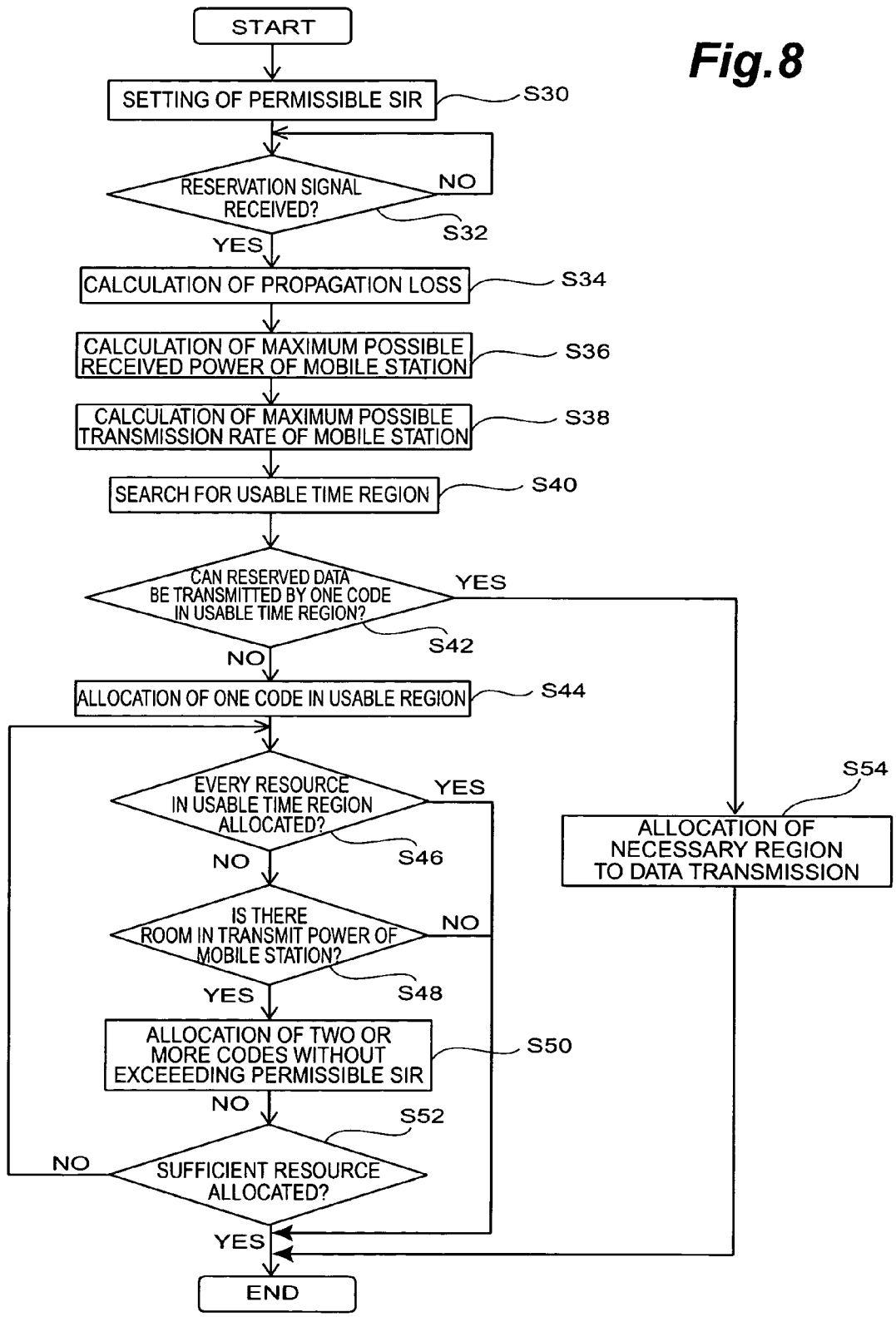
FIG. 8 is a flowchart showing a resource allocating method according to a second embodiment.

The resource allocating method according to the second embodiment will be described below with reference to FIG. 8. FIG. 8 is a flowchart showing the operation of resource allocation at base station 11.

First, as a preparation stage for implementing the resource allocation according to the present embodiment, base station 11 sets the value of SIR permitted at the base station 11 (permissible SIR) (S30).

Prior to transmission of data packets, mobile station 13 transmits to base station 11 a reservation signal containing the transmit power information, maximum transmit power information, and others. Base station 11 always waits for a reservation signal (S32). When base station 11 receives a reservation signal, it calculates a propagation loss in transmission of a packet from mobile station 13 to base station 11 (S34). Specifically, the base station first retrieves the transmit power information out of the reservation signal, and calculates the propagation loss on the basis of the retrieved transmit power information and the information about the received power upon reception of the reservation signal.

Then base station 11 calculates a maximum received power at base station 11 on the basis of the calculated propagation loss and the maximum transmit power information of mobile station 13 included in the reservation signal (S36), and calculates a maximum transmission rate at which mobile station 13 can transmit (maximum transmission rate), based on the maximum received power (S38). Subsequently, base station 11 searches for a resource in an available time region (S40).

When there is an allocable resource in the available time region, base station 11 retrieves information about the volume of data packets in the reservation signal, and determines whether the data packets can be transmitted by one code in the available time region (S42). When it is determined that the data packets can be transmitted by one code, the resource in the available region is allocated by a region necessary for the data transmission (S54). Namely, instead of allocating the entire resource of one code in the available region, slots in the number necessary for the data transmission are allocated in the resource of one code. When the resource of one code is enough to transmit the data packets, the above completes the resource allocation.

When the data packets cannot be transmitted by one code, the resource of one code in the available time region is allocated (S44), and thereafter it is determined whether every resource in the available time region has been allocated (S46). When every resource in the available time region is allocated, the flow of resource allocation is terminated. In this case, the resource enough to transmit the entire data packet volume designated by the reservation signal cannot be secured. For the data over the resource secured, the mobile station again transmits a reservation signal and the base station allocates a further resource. On the other hand, when every resource in the available time region is not allocated yet, base station 11 determines whether there is room in the transmit power of mobile station 13, based on the maximum transmission rate calculated at step S38 (S48). When there is no room in the transmit power of mobile station 13, the flow of resource allocation ends. When there is room in the transmit power of mobile station 13, the base station allocates the second code in the available time region to target mobile station 13. Namely, the base station allocates two or more codes to communication with one mobile station 13 (S50). This allocation of plural codes is carried out within the scope where interference to communication with other mobile stations 13 connected to base station 11 does not exceed the permissible SIR. Then base station 11 determines whether the sufficient resource is allocated to target mobile station 13 (S52). When the sufficient resource is allocated, the flow of resource allocation ends. When it is determined that the resource allocated is insufficient, the base station moves to step S46 to determine whether every available resource in the available time region has been allocated. When the resource enough to transmit the data packets is allocated, or when every resource in the available time region is allocated, as described above, the resource allocation process is terminated. After the end of the resource allocation process, base station 11 again moves to step S32 to wait for reception of a reservation signal.

According to the resource allocating method of the present embodiment, the base station determines whether there is room in the transmit power of mobile station 13, on the basis of the maximum transmission rate of mobile station 13, and allocates the resource, based thereon, whereby the resource can be efficiently used, while preventing the resource from being allocated to mobile station 13 over the capability of mobile station 13.

The above described the radio packet communication system 10 according to the present invention, the base station 11 and mobile station 13 of the present invention forming the system, and the resource allocating methods thereof, using the embodiments thereof, but it is noted that the present invention is by no means intended to be limited to the above embodiments.

In the above embodiments, the first embodiment described the allocation method of varying the reserved time length of the resource according to the priority level, and the second embodiment described the resource allocating method based on the maximum transmission rate at which mobile station 13 could transmit. However, it is needless to mention that the present invention can also be applied to systems provided with the two features. Namely, the system may be configured to set the reserved time region according to the priority level and to allocate the resource within the maximum transmission rate of mobile station 13, whereby the resources can be used more efficiently.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A resource allocating method in a radio packet communication system for transmission and reception of packet data between a base station and a mobile station, in which the base station allocates a necessary resource to communication with the mobile station, the resource allocating method comprising:

a reservation signal transmitting step wherein the mobile station transmits a reservation signal containing priority level information about a priority level of communication to let the base station receive the reservation signal;

a reserved time length setting step wherein, based on the priority level information in the reservation signal transmitted in the reservation signal transmitting step, the base station sets (i) a length of a reserved time for allocation of a resource, as a reserved time length, and (ii) a start time of the reserved time, and the reserved time length setting step sets a start time of a reserved time corresponding to a low priority in the priority level information to be earlier than a start time of a reserved time corresponding to a high priority in the priority level information; and a resource allocation reserving step wherein, when there is a resource available for allocation in a reserved time region defined by the reserved time length set in the reserved time length setting step, from a predetermined reservation start time, the base station reserves allocation of a resource for the communication with the mobile station having transmitted the reservation signal.

2. The resource allocating method according to claim 1, wherein a spreading code to be allocated to the mobile station is designated for each said reservation signal.

3. A base station configured to perform transmission and reception of packet data to and from a mobile station and allocate a necessary resource to communication with the mobile station, the base station comprising:
- a reservation signal receiving unit configured to receive a reservation signal transmitted from the mobile station and containing priority level information about a priority level of communication;
- a reserved time length setting unit configured to, based on the priority level information in the reservation signal received by the reservation signal receiving, set (i) a length of a reserved time for allocation of a resource, as a reserved time length, and (ii) a start time of the reserved time, and the reserved time length setting unit is further configured to set a start time of a reserved time corresponding to a low priority in the priority level information to be earlier than a start time of a reserved time corresponding to a high priority in the priority level information; and
- a resource allocation reserving unit configured to, when there is a resource available for allocation in a reserved time region defined by the reserved time length set by the reserved time length setting unit, from a predetermined reservation start time, allocate a resource for the communication with the mobile station as a transmitter of the reservation signal.

4. The base station according to claim 3, wherein the reserved time length setting unit sets a longer reserved time length for a high priority level than for a low priority level, based on the priority level information in the reservation signal.

5. The base station according to claim 3, wherein the resource allocation reserving unit sets the reservation start time on the basis of at least one of a reception time when the reservation signal receiving unit receives the reservation signal, and the priority level information in the reservation signal.

6. The base station according to claim 3, wherein a spreading code to be allocated to the mobile station is designated for each said reservation signal.

7. A base station configured to implement transmission and reception of packet data by code division multiplexing to and from a mobile station and allocate a necessary resource to communication with the mobile station, the base station comprising:
- a reservation signal receiving unit configured to receive a reservation signal transmitted from the mobile station and containing maximum transmit power information of the mobile station and transmit power information of the reservation signal;
- a propagation loss calculating unit configured to calculate a propagation loss in transmission of a packet from the mobile station, based on the transmit power information in the reservation signal received by the reservation signal receiving unit and information about a received power in reception of the reservation signal by the reservation signal receiving unit;
- a maximum received power calculating unit configured to calculate a maximum received power of a signal received from the mobile station, based on the maximum transmit power information in the reservation signal and the propagation loss calculated by the propagation loss calculating unit;
- a maximum transmission rate calculating unit configured to calculate a maximum transmission rate allocable to the mobile station, based on the maximum received power calculated by the maximum received power calculating unit; and
- a resource allocating unit configured to allocate a resource to the mobile station, based on the maximum transmission rate calculated by the maximum transmission rate calculating unit.

8. A radio packet communication system for transmission and reception of packet data between a base station and a mobile station,
wherein the mobile station comprises a reservation signal transmitting unit configured to transmit a reservation signal containing priority level information about a priority level of communication, to the base station, and
wherein the base station comprises:
- a reservation signal receiving unit configured to receive the reservation signal transmitted from the mobile station;
- a reserved time length setting unit configured to set (i) a length of a reserved time for allocation of a resource by the base station, as a reserved time length, and (ii) a start time of the reserved time based on the priority level information in the reservation signal received by the reservation signal receiving unit, and the reserved time length setting unit is further configured to set a start time of a reserved time corresponding to a low priority in the priority level information to be earlier than a start time of a reserved time corresponding to a high priority in the priority level information; and
- a resource allocation reserving unit configured to reserve allocation of a resource for the communication with the mobile station having transmitted the reservation signal to the base station, when there is a resource available for allocation in a reserved time region defined by the reserved time length set by the reserved time length setting unit, from a predetermined reservation start time.

9. A resource allocating method in a radio packet communication system for transmission and reception of packet data between a base station and a mobile station, in which the base station allocates a necessary resource to communication with the mobile station, the resource allocating method comprising:
- a reservation signal transmitting step wherein the mobile station transmits a reservation signal containing priority level information about a priority level of communication to let the base station receive the reservation signal;
- a reserved time region setting step wherein, when the priority level information in the reservation signal transmitted in the reservation signal transmittal step, indicates a high priority level, the base station sets a first reserved time region including a first reserved time length based on said high priority level, when said priority level information indicates a low priority level lower than said high priority level, the base station sets a second reserved time region including a second reserved time length that is shorter than said first reserved time length; and
- a resource allocation reserving step wherein when the base station receives the reservation signal indicating the high priority level and when there is a resource available for allocation in the first reserved time region, the base station reserves allocation of the resource in the first reserved time region for the communication with the mobile station having transmitted the reservation signal, and when the base station receives the reservation signal indicating the low priority level and when there is a resource available in the second reserved time region, the base station reserves allocation of the resource in said second reserved time region for the communication with the mobile station having transmitted the reservation signal, wherein said first reserved time region is a region that is set from predetermined reservation start time and said first reserved time includes the second reserved time region.

10. The resource allocating method according to claim 9, wherein a spreading code to be allocated to the mobile station is designated for each said reservation signal.

11. A base station configured to perform transmission and reception of packet data to and from a mobile station and allocate a necessary resource to communication with the mobile station, the base station comprising:

a reservation signal receiving unit configured to receive a reservation signal transmitted from the mobile station and containing priority level information about a priority level of communication;

a reserved time region setting unit configured to, when the priority level information in the reservation signal indicates a high priority level, set a first reserved time region including a first reserved time length based on said high priority level, and when said priority level information indicates a low priority level lower than said high priority level, set a second reserved time region including a second reserved time length that is shorter than said first reserved time length; and a resource allocation reserving unit configured to, when the reservation signal indicates the high priority level and when there is a resource available for allocation in the first reserved time region, reserve allocation of the resource in the first reserved time region for the communication with the mobile station having transmitted the reservation signal, and when the reservation signal indicates the low priority level and when there is a resource available in the second reserved time region, reserve allocation the resource in said second reserved time region for the communication with the mobile station having transmitted the reservation signal, wherein said first reserved time region is a region that is set from predetermined reservation start time and said first reserved time includes the second reserved time region.

12. The base station according to claim 11, wherein a spreading code to be allocated to be mobile station is designated for each said reservation signal.

13. A radio packet communication system for transmission and reception of packet data between a base station and a mobile station, wherein the mobile station comprises a reservation signal transmitting unit configured to transmit a reservation signal containing priority level information about a priority level of communication, to the base station, and wherein the base station comprises:

a reservation signal receiving unit configured to receive the reservation signal transmitted from the mobile station;

a reserved time region setting unit configured to, when the priority level information in the reservation signal indicates a high priority level, set a first reserved time region including a first reserved time length based on said high priority level, and when said priority level information indicates a low priority level lower than said high priority level, set a second reserved time region including a second reserved time length that is shorter than said first reserved time length; and a resource allocation reserving unit configured to, when the reservation signal indicates the high priority level and when there is a resource available for allocation in the first reserved time region, reserve allocation of the resource in the first reserved time region for the communication with the mobile station having transmitted the reservation signal, and when the reservation signal indicates the low priority level and when there is a resource available in the second reserved time region, reserve allocation of the resource in said second reserved time region for the communication with the mobile station having transmitted the reservation signal, wherein said first reserved time region is a region that is set from predetermined reservation start time and said first reserved time includes the second reserved time region.

14. A radio packet communication system according to claim 13, wherein said mobile station configured to, using a resource allocated by a base station, perform transmission and reception of packet data to and from the base station, the mobile station comprising:

reservation signal transmitting means for transmitting a reservation signal containing priority level information about a priority level of communication, to the base station.

15. A radio packet communication system according to claim 14, wherein the mobile station further comprises:

communication means for performing communication using a spreading code designated by the base station for each reservation signal transmitted by the reservation signal transmitting means.

* * * * *